(12) United States Patent
Rajski et al.

(10) Patent No.: US 10,361,873 B2
(45) Date of Patent: Jul. 23, 2019

(54) TEST POINT-ENHANCED HARDWARE SECURITY

(71) Applicant: Mentor Graphics Corporation, Wilsonville, OR (US)

(72) Inventors: Janusz Rajski, West Linn, OR (US); Nilanjan Mukherjee, Wilsonville, OR (US); Elham K. Moghaddam, Beaverton, OR (US); Jerzy Tyszer, Poznan (PL); Justyna Zawada, Paczkowo (PL)

(73) Assignee: Mentor Graphics Corporation, Wilsonville, OR (US)

( * ) Notice: Subject to any disclaimer, the term of this patent is extended or adjusted under 35 U.S.C. 154(b) by 261 days.

(21) Appl. No.: 15/353,412

(22) Filed: Nov. 16, 2016

(65) Prior Publication Data
US 2017/0141930 A1  May 18, 2017

Related U.S. Application Data

(60) Provisional application No. 62/256,031, filed on Nov. 16, 2015.

(51) Int. Cl.
| | | |
|---|---|---|
| *G06F 1/26* | (2006.01) | |
| *G06F 11/00* | (2006.01) | |
| *G08B 13/00* | (2006.01) | |
| *G08B 21/00* | (2006.01) | |
| *G08B 29/00* | (2006.01) | |
| *H04L 9/32* | (2006.01) | |
| *G01R 31/317* | (2006.01) | |

(Continued)

(52) U.S. Cl.
CPC ...... *H04L 9/3278* (2013.01); *G01R 31/31719* (2013.01); *G01R 31/318588* (2013.01); *G06F 21/75* (2013.01); *H04L 9/0662* (2013.01); *H04L 2209/12* (2013.01)

(58) Field of Classification Search
USPC .......................................................... 726/34
See application file for complete search history.

(56) References Cited

U.S. PATENT DOCUMENTS

| | | | |
|---|---|---|---|
| 8,667,265 B1* | 3/2014 | Hamlet | H04L 9/0866 326/80 |
| 2005/0081130 A1* | 4/2005 | Rinderknecht | G01R 31/318547 714/726 |
| 2016/0109517 A1 | 4/2016 | Rajski | |

OTHER PUBLICATIONS

Briers, A. J. and Totton, K. A. E., "Random Pattern Testability by Fault Simulation", Proceedings of the IEEE International Test Conference, ITC'86. 274-281, 1986.

(Continued)

*Primary Examiner* — Anthony D Brown
*Assistant Examiner* — Samuel Ambaye

(57) ABSTRACT

Various aspects of the disclosed technology relate to techniques of using control test points to enhance hardware security. The design-for-security circuitry reuses control test points, a part of design-for-test circuitry. The design-for-security circuitry comprises: identity verification circuitry; scrambler circuitry coupled; and test point circuitry. The test point circuitry comprises scan cells and logic gates The identify verification circuitry outputs an identity verification result to the scrambler circuitry to enable/disable control test points of the test point circuitry through the logic gates, and the scrambler circuitry outputs logic bits for loading the scan cells to activate/inactivate the control test points through the logic gates.

16 Claims, 8 Drawing Sheets

(51) Int. Cl.
*H04L 9/06* (2006.01)
*G01R 31/3185* (2006.01)
*G06F 21/75* (2013.01)

(56) References Cited

OTHER PUBLICATIONS

Iyengar, V. S. and Brand, D., "Synthesis of Pseudorandom Pattern Testable Designs", Proceedings of the IEEE International Test Conference, ITC'89. 501-508, 1989.

Cheng, K.-T., and Lin, C.-J., "Timing-Driven Test Point Insertion for Full-Scan and Partial-Scan BIST", Proceedings of the IEEE International Test Conference, ITC'95, 506-514, 1995.

Nakao, M., Hatayama, K., and Highasi, I., "Accelerated test points selection method for scan-based BIST", Proceedings of the IEEE Asian Test Symposium, ATS'97, 359-364, 1997.

Beaulieu, R. et al., "The SIMON and SPECK lightweight block ciphers", Proceedings of the IEEE De-sign Automation Conference, DAC'15, Paper 175 (2015).

Canniere, C. et al., "KATAN and KTANTAN—A family of small and efficient hardware-oriented block-ciphers"Proceedings of the International Workshop on Cryptographic Hardware and Embedded Systems, vol. 5747. 272-288 (2009).

Bogdanov, A. et al., "PRESENT: An ultra-lightweight block cipher", Cryptographic Hardware and Embedded System, vol. 4727. 450-466 (2007).

Kitsos, P. et al., "Hardware implementation of the RC4 stream cipher", Proceedings of the IEEE Midwest Symposium on Circuits and Systems, vol. 3, 1363-1366 (2003).

Hell, M. et al., "The Grain family of stream ciphers", New Stream Cipher Designs, vol. 4986, 179-190 (2008).

Berbain, C. et al., "DECIM—A new stream cipher for hardware applications", Ecrypt Stream Cipher Project Report 2005/004.

C. Herder, M.-D. et al., "Physical unclonable functions and applications: a tutorial," Proc. IEEE, vol. 102, pp. 1126-1141 (2014).

M. Rostami, F. Koushanfar, and R. Karri, "A primer on hardware security: models, methods, and metrics," Proc. IEEE, vol. 102, pp. 1283-1295, 2014.

D. Hely et al., "Scan design and secure chip (secure IC testing)," Proc. IOLTS, 2004, pp. 219-224.

J. Lee, M. Tehranipoor, and J. Plusquellic, "A low-cost solution for protecting IPs against scan-based side-channel attacks," Proc. VTS, 2006, pp. 94-99.

B. Yang, "Secure scan: a design-for-test architecture for crypto chips," Proc. DAC, 2005, pp. 135-140.

\* cited by examiner

TEST POINT-ENHANCED HARDWARE SECURITY

RELATED APPLICATIONS

This application claims the benefit of U.S. Provisional Patent Application No. 62/256,031, filed on Nov. 16, 2015, and naming Janusz Rajski et al. as inventors, which application is incorporated entirely herein by reference.

FIELD OF THE DISCLOSED TECHNIQUES

The presently disclosed techniques relates to the field of circuit security technology. Various implementations of the disclosed techniques may be particularly useful for enhancing circuit security by reusing control test points.

BACKGROUND OF THE DISCLOSED TECHNIQUES

Globalization of the semiconductor design and manufacturing processes makes integrated circuits (ICs) more vulnerable to malicious activities and alterations than ever before. Reverse engineering, IP (third-party intellectual property) piracy, IC overproduction, and repacking of old ICs have quickly become serious challenges for the IC supply chain. It appears that the global value of counterfeit goods for G20 nations can be now in excess of US $1.7 trillion, and that eliminates or replaces 2.5 million jobs that would otherwise be deployed for legitimate goods. The IC reverse engineering identifies the device technology, structure, and/or its functionality. The objective of the attacker is to successfully reveal a design structure by means of destructive or non-destructive methods. Once the IP netlist is known, it can be illegally sold or used to design other ICs (IC piracy). Also, one can reuse the components extracted from competing products, thus revealing trade secrets. Due to these harmful effects, a pure social loss, and the cost of combating IC counterfeiting and piracy, reverse engineering is considered as one of the most serious threats to the semiconductor industry.

Various defense methods are deployed to hinder reverse engineering and to prevent IP theft. For instance, camouflaging hampers the image processing-based extraction of gate-level netlist by concealing some gates or introducing dummy contacts into the layout. Another technique to impede reverse engineering is logic obfuscation. Encryption blocks (also known as key gates), such as XOR gates, multiplexers and memory elements, are inserted in certain IC locations in order to hide functionality and implementation. A design will function properly only if a correct key drives all of the key gates. Unfortunately, on-chip storage of secret information is inherently prone to a variety of attacks, including side-channel analysis, imaging, and fault analysis.

Physical unclonable functions (PUFs), originally proposed to secure designs through a resilient authentication based on intrinsic semiconductor process variability, can also be used to guide the obfuscation method. In this approach, a device signature may be derived from design-specific attributes, which is clone-resistant as it is virtually impossible to control the manufacturing process variations.

The possibility of hiding logic circuit's functionality carries major implications, however. Obfuscating design logic may introduce unacceptable area, performance, and power overheads. It is thus desirable to explore new techniques that take advantage of circuitry for other purposes to improve the circuit security.

BRIEF SUMMARY OF THE DISCLOSED TECHNIQUES

Various aspects of the disclosed technology relate to techniques of using control test points to enhance hardware security. In one aspect, there is an integrated circuit, comprising: identity verification circuitry; scrambler circuitry coupled to the identity verification circuitry; and test point circuitry coupled to the scrambler circuitry, the test point circuitry comprising scan cells and logic gates, wherein the identify verification circuitry outputs an identity verification result to the scrambler circuitry to enable/disable control test points of the test point circuitry through the logic gates, and the scrambler circuitry outputs logic bits for loading the scan cells to activate/inactivate the control test points through the logic gates.

The identity verification circuitry may be a block cipher, a stream cipher, a hash function module or a physical unclonable function (PUF).

The scrambler circuitry may comprise a pseudorandom pattern generator. The pseudorandom pattern generator may be a randomly-seeded linear-feedback shift register. The pseudorandom pattern generator may be a weighted pseudorandom pattern generator.

The scrambler circuitry may further comprise a clock cycle counter of which an output signal serves as a scan enable signal for the scan cells in mission mode.

Some or all of the scan cells may form one or more dedicated scan chains. Some or all of the scan cells may be on one or more mixed-mode scan chains.

The logic bits may be directly shifted into the scan cells. The logic bits may be shifted into a decompressor or a pseudorandom pattern generator for loading the scan cells.

In another aspect, there are one or more non-transitory computer-readable media storing computer-executable instructions for causing one or more processors to insert circuitry into a circuit design, the circuitry comprising: identity verification circuitry; scrambler circuitry coupled to the identity verification circuitry; and test point circuitry coupled to the scrambler circuitry, the test point circuitry comprising scan cells and logic gates, wherein the identify verification circuitry outputs an identity verification result to the scrambler circuitry to enable/disable control test points of the test point circuitry through the logic gates, and the scrambler circuitry outputs logic bits for loading the scan cells to activate/inactivate the control test points through the logic gates.

In still another aspect, there is a method, comprising: generating an invalid identity result by identity verification circuitry in an integrated circuit; using the invalid identity result to enable control test points of test point circuitry by scrambler circuitry; loading logic bits derived based on outputs of the scrambler circuitry to scan cells associated with the control test points; and using the logic bits in the scan cells to activate/inactivate the control test points by the scrambler circuitry.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclose techniques. Thus, for example, those skilled in the art will recognize that the disclose techniques may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNIQUES

General Considerations

Figure 1:
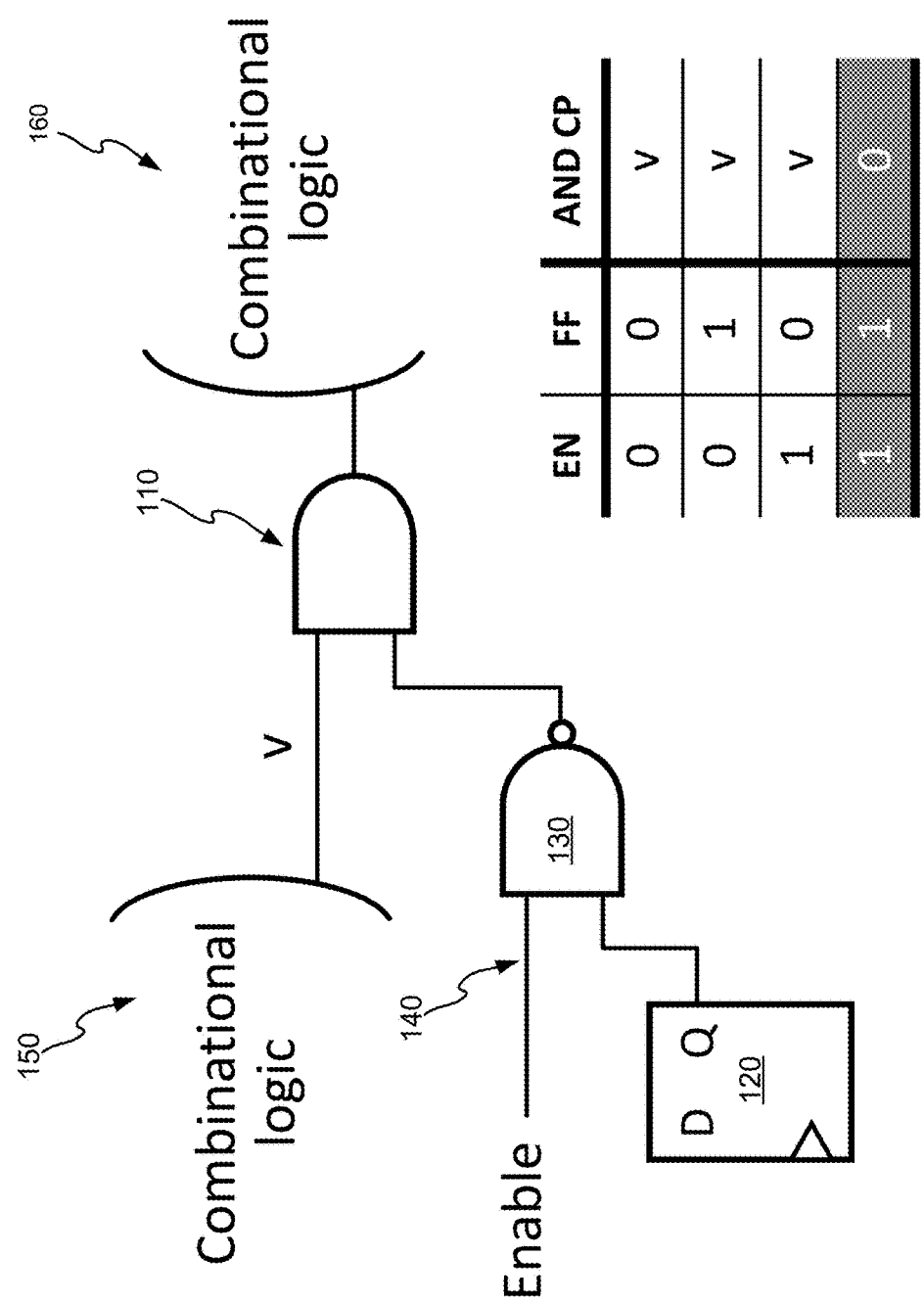
FIG. 1 illustrates an example of an AND gate-based control test point.

Various aspects of the disclosed technology relate to techniques of using control test points to enhance hardware security. In the following description, numerous details are set forth for the purpose of explanation. However, one of ordinary skill in the art will realize that the disclosed technology may be practiced without the use of these specific details. In other instances, well-known features have not been described in details to avoid obscuring the disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Test Point Insertion

Traditionally, test point insertion techniques have been used to improve the fault detection likelihood while minimizing a necessary hardware real estate. They select circuit paths (also referred to as internal lines) in a circuit to add control test points (control points) or observation test points (observation points) in order to activate (excite) faults or observe them, respectively. An optimal test point insertion is an NP-complete problem and hence numerous empirical guidelines and approximate techniques have been proposed to identify suitable control test point and observation test point locations.

The first systematic test point insertion method was introduced in Briers, A. J. and Totton, K. A. E., "Random Pattern Testability By Fault Simulation", Proceedings of the IEEE International Test Conference, ITC'86, 274-281, 1986, which is incorporated herein by reference. This method uses simulations to obtain profiles of fault propagation and correlations between internal signals. Test points are then inserted to break the identified signal correlations.

Similarly, the technology disclosed in Iyengar, V. S. and Brand, D., "Synthesis Of Pseudorandom Pattern Testable Designs", Proceedings of the IEEE International Test Conference, ITC'89, 501-508, 1989, which is incorporated herein by reference, employs fault simulation to identify gates that block fault propagation and inserts test points to regain successful propagation of fault effects.

To avoid time-consuming simulations, other methods utilize the controllability and observability measures to identify the hard-to-control and hard-to-observe sectors of a circuit. Test points are then inserted into these sectors. In particular, the schemes disclosed in Cheng, K.-T., and Lin, C.-J., "Timing-Driven Test Point Insertion For Full-Scan And Partial-Scan BIST", Proceedings of the IEEE International Test Conference, ITC'95, 506-514, 1995, and Nakao, M., Hatayama, K., and Highasi, I., "Accelerated test points selection method for scan-based BIST", Proceedings of the IEEE Asian Test Symposium, ATS'97, 359-364, 1997, which are incorporated herein by reference, use COP (Controllability Observability Program) estimates to extract testability data.

Hybrid testability measures based on the SCOAP (Sandia Controllability/Observability Analysis Program) metrics, cost functions, gradient-based schemes, or signal correlation are also employed to determine the best test point sites.

Another class of test points has been disclosed in U.S. patent application Ser. No. 14/884,611, filed on Oct. 16, 2015, entitled "Test point insertion for low test pattern counts", and naming Janusz Rajski et al. as inventors, which application is incorporated entirely herein by reference. Unlike traditional test point insertion techniques, this new method identifies test point sites based on internal signal conflicts caused by detecting multiple faults with a single test pattern. Inserting test points at these sites can increase the number of faults detected by a single pattern and reduce test pattern counts and test data volume.

The presently disclosed technology may utilize control test points inserted according to any of the current or future test point insertion techniques such as those discussed above to enhance hardware security.

Figure 2:
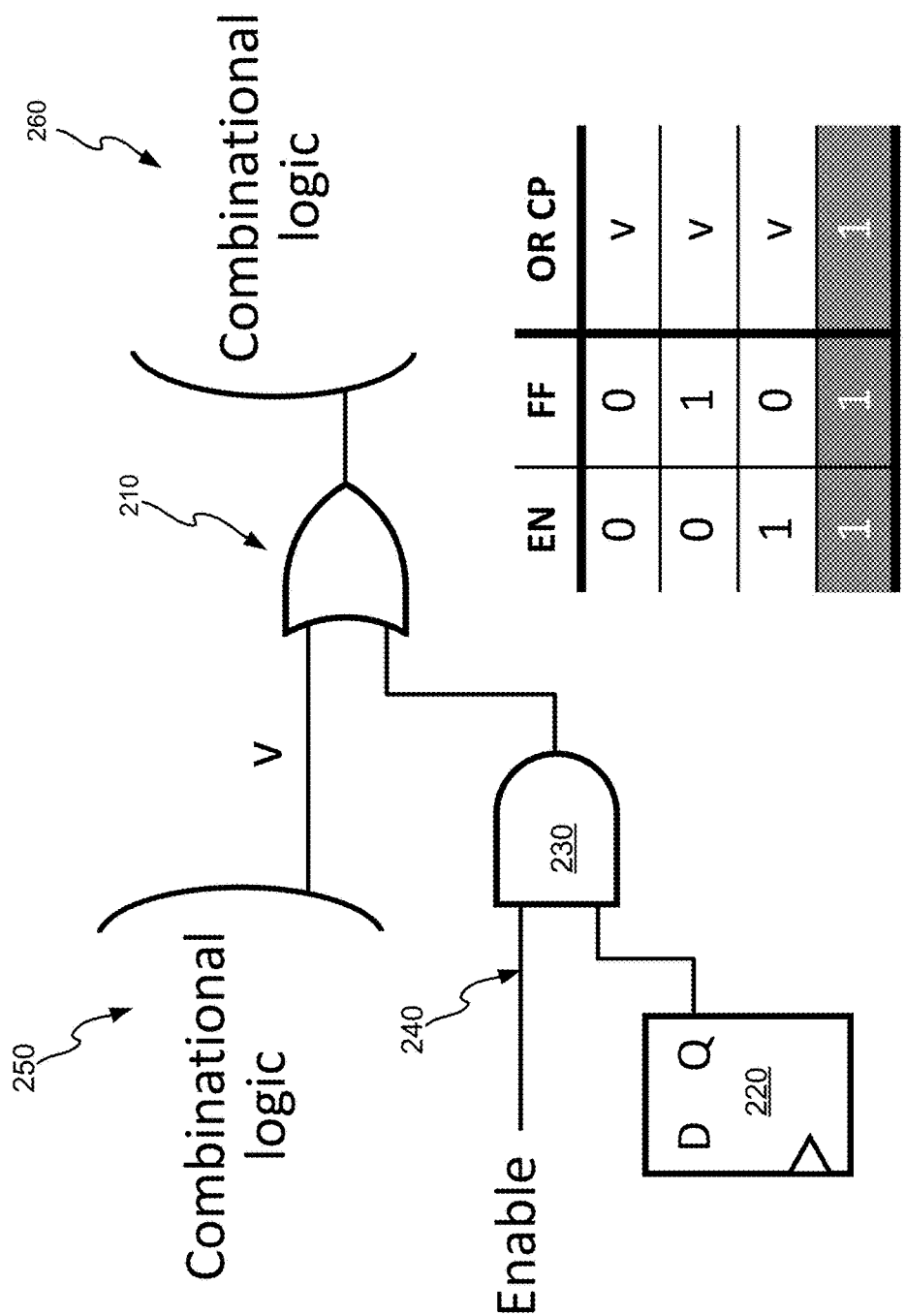
FIG. 2 illustrates an example of an OR gate-based control test point.

FIGS. 1 and 2 illustrate an example of an AND gate-based control test point (110) and an example of an OR gate-based control test point (210), respectively. As can be seen, the AND gate-based control test point 110 is connected to a scan cell 120 via a NAND gate 130, whereas the OR gate-based control test point 210 is driven by a scan cell 220 via an AND gate 230. Truth tables explaining the relevant logical operations are also displayed in the figures. In order to force a fixed logic value at a particular node in a circuit, one needs to not only enable but also activate the corresponding control test point. For example, when the test point enable signal (Enable) 140 in FIG. 1 is asserted, the control test point 110 can block a signal v from combinational logic 150 if it is activated by the output of its driver scan cell; and when the test point enable signal 240 in FIG. 2 is asserted, the control test point 210 can block a signal v from combinational logic 250 depending upon the output of its driver scan cell.

In FIG. 1, if the output of the scan cell 120 is set to 1, the control test point 110 will inject a logic value "0" into combinational logic 160. Similarly, if the output of the scan cell 220 is set to 1, the control test point 210 will inject a logic value "1" into combinational logic 170.

FIGS. 1 and 2 are just examples of the control test points. The control test points can be implemented by different gates and/or circuit topologies.

Design for Security and Design for Test

Design for test (DFT) aims at improving controllability and observability of circuit internal nodes. Design for security (DFS), on the other hand, pursues to restrain access to chip internal structures and their proprietary extensions. The two objectives may not be aligned. The presence of on-chip test infrastructure can lead to a number of threats and may jeopardize the overall system security. It has been reported that a backdoor, which takes advantage of a standard port for testing, was found in a military grade FPGA device. Such a backdoor insertion makes the device wide open to intellectual property (IP) theft, fraud, re-programming as well as reverse engineering of the design which allows the introduction of a new backdoor or Trojan.

To achieve high test coverage while maintaining acceptable level of security, techniques such as scan chain scrambling and encryption with hard-coded keys have been developed. Unfortunately, none of the existing solutions is able to inherently accommodate all testability and security demands without compromising either of them.

Figure 3:
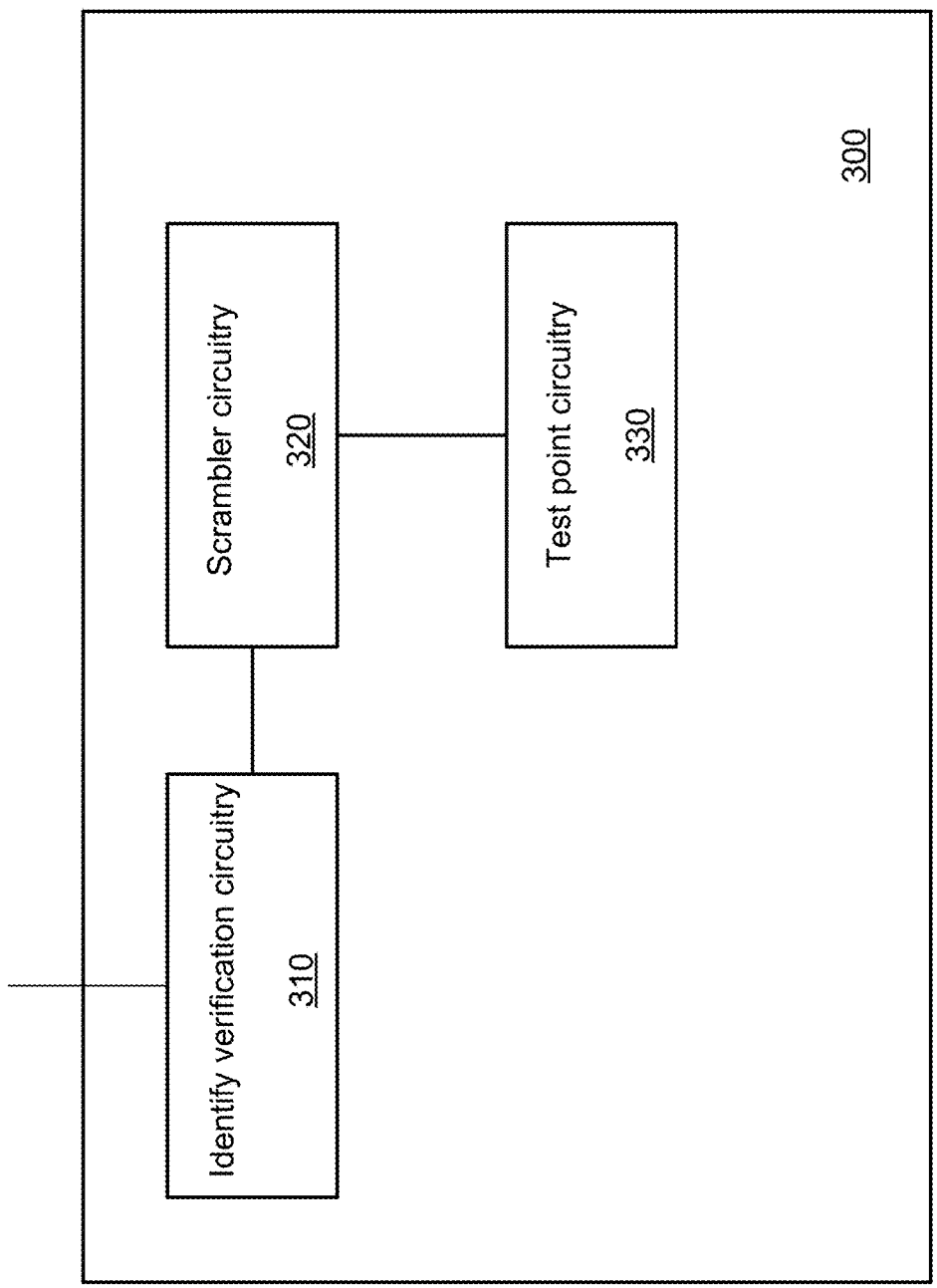
FIG. 3 illustrates a design-for-security circuit architecture according to various embodiments of the disclosed technology.

FIG. 3 illustrates a design-for-security circuit architecture according to various embodiments of the disclosed technology. This design for security architecture reuses an existing test infrastructure to modify or to obfuscate, on the fly, design internal functionality once an attempt to unauthorized access is detected.

The circuit 300 shown in FIG. 3 comprises identity verification circuitry 310, scrambler circuitry 320 and test point circuitry 330. The identity verification circuitry 310 may perform identity verification by itself or in collaboration with an outside source. The identity verification circuitry 310 may be implemented by hardware-based ciphers such as block ciphers, stream ciphers, and hash function modules (MD5 or SHA-2).

A variety of block ciphers are described in Beaulieu, R. et al., "The SIMON and SPECK lightweight block ciphers", Proceedings of the ACM/EDAC/IEEE Design Automation Conference, DAC'15, paper 175, 2015, Canniere, C. et al., "KATAN and KTANTAN—A family of small and efficient hardware-oriented block-ciphers", Proceedings of the International Workshop on Cryptographic Hardware and Embedded Systems, vol. 5747. 272-288, 2009, and Bogdanov, A. et al., "PRESENT: An ultra-lightweight block cipher", Cryptographic Hardware and Embedded System, vol. 4727, 450-466, 2007, which are incorporated herein by reference.

A variety of stream ciphers are described in Kitsos, P. et al., "Hardware implementation of the RC4 stream cipher", Proceedings of the IEEE Midwest Symposium on Circuits and Systems, vol. 3, 1363-1366, 2003, Hell, M. et al., "The Grain family of stream ciphers", New Stream Cipher Designs, Vol. 4986, 179-190, 2008, and Berbain, C. et al., "DECIM—A new stream cipher for hardware applications", ECRYPT Stream Cipher Project Report 2005/004, which are incorporated herein by reference.

The identity verification circuitry 310 may also be implemented by a hardware-based physical unclonable function (PUF). This identity verification scheme uses PUF authentication and a key exchange protocol (KEP). In one implementation of the scheme, a chip is activated via a pay-per-device license generated by a trusted party (Verifier) in a response to requests generated by a party (Prover) with access to the circuit 300. The identity verification circuitry 310 extracts characteristics of the circuit 300 in the form of challenge-response pairs (CRPs) by taking advantage of imperfections and uncertainties in a fabrication process. Note that linear error-correcting codes are often used to reduce a PUF response bit error due to an inevitable noise these circuits may produce. The PUF response is used to check the authenticity of a design and to generate a chip-dependent key to unlock the device. This unique key is a result of processing the license delivered by the Verifier and the PUF response generated for a particular challenge.

To hinder attacks based on pre-recording and replaying previously used CRPs, one may deploy a strong PUF to enlarge the CRP space, which is described in C. Herder, M.-D. et al., "Physical unclonable functions and applications: a tutorial," Proc. IEEE, vol. 102, pp. 1126-1141 (2014), which is incorporated herein by reference. Note that this activation mechanism enables identification of counterfeit chips during activation.

To generate a design-unlocking key, a trusted party creates a post-fabrication database of CRPs for every IC chip. The physical access to PUF measurements is permanently disabled before deployment, e.g., by burning irreversible fuses, so other parties cannot build a CRP database. If the response sent by the Prover matches the particular challenge in the database, then the chip is unlocked. The remote activation scheme works as follows: the Prover first sends an activation request to the Verifier; the Verifier then requests the PUF response for a given challenge; and finally, if the response matches a database entry, a unique license unlocking the device is provided to the Prover, otherwise the Verifier launches a locking scheme.

Upon the identity verification, the identity verification circuitry 310 provides the identity verification result to the scrambler circuitry 320. The scrambler circuitry 320 can operate in two modes: a transparent mode and an obfuscation mode. In the transparent mode, the original circuit works as intended, i.e., test points are disabled and remain transparent to the circuit operations. In the obfuscation mode, design functionality is concealed by enabling the control test points.

With various implementations of the disclosed technology, the scrambler circuitry 320 may shift certain binary sequences into respective scan chains to gradually activate successive groups of control points. For example, an active AND gate-based control test point injects a constant logic value of 0 at its site and gates all other signals converging at this particular location. Similarly, an active OR gate-based control test point replaces signals merging at its location with the constant value of 1. As a result, the design operates in a mode which exhibits incorrect functionality, and its behavior becomes unpredictable, which makes it difficult for an adversary to comprehend the actual functionality of the design.

Figure 4:
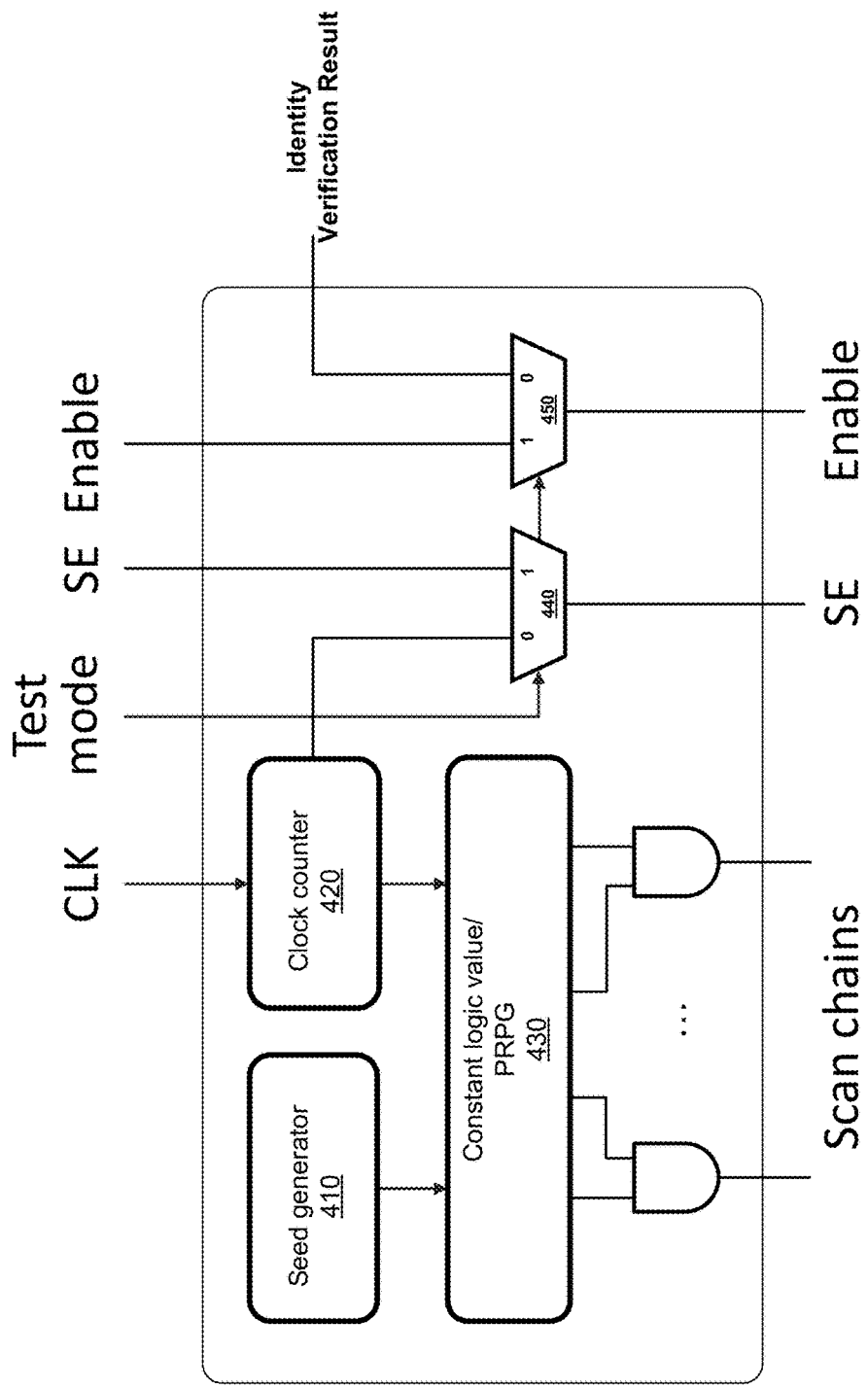
FIG. 4 illustrates an example of a block diagram of scrambler circuitry according to some embodiments of the disclosed technology.

The scrambler may be implemented in a variety of fashions. An example of a block diagram of the scrambler circuitry 320 according to some embodiments of the disclosed technology is shown in FIG. 4. The test mode (TM) signal toggles between normal function (mission) and test modes. During a production test, the signal TM is asserted and both the test point enable (Enable) and scan enable (SE) signals are controlled by a tester through multiplexers 450 and 440, respectively.

In the mission mode, the test point enable (Enable) comes from a signal representing the identity verification result delivered by the identity verification circuitry 310 while the scan enable (SE) signal depends on a clock cycle counter 420 in such a way that every predefined number of cycles, SE becomes asserted, and either a constant logic value of 1 or a pseudorandom value, generated by the constant logic value/PRPG 430, is shifted into scan chains. It allows groups of control test points to be activated one at a time. The seed generator 410 supplies seeds to the PRPG module in the constant logic value/PRPG 430. Control test points are enabled when the access is not authorized. Otherwise, they are transparent to the functional circuit.

Figure 5:
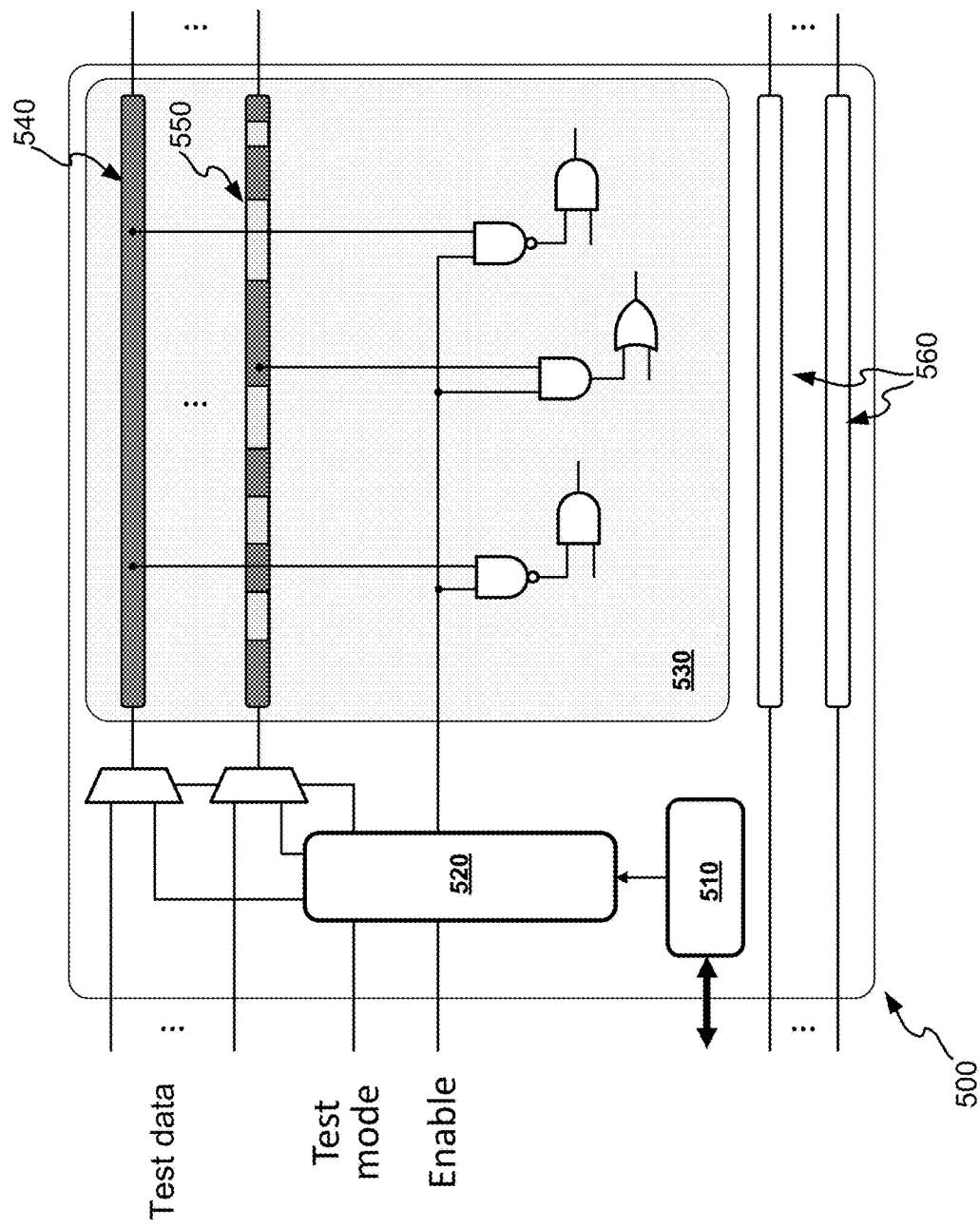
FIG. 5 illustrates an example of design-for-security circuitry according to some embodiments of the disclosed technology.

FIG. 5 illustrates an example of design-for-security circuitry according to some embodiments of the disclosed technology. A circuit 500 in the figure comprises identity verification circuitry 510, scrambler circuitry 520 and test point circuitry 530. The identity verification circuitry 510 may be a physical unclonable function (PUF). The scrambler circuitry 520 may adopt the design shown in FIG. 4. The outputs of the scrambler circuitry 520 are shown as driving two scan chains 540 and 550 associated with control test points. Scan chain 540 hosts exclusively scan cells acting as drivers of control test points and is referred to as a dedicated scan chain. In scan chain 550, scan cells that drive control test points are interspersed among other (traditional) scan cells. A scan chain in this configuration is called a mixed-mode scan chain. It is worth noting that the scan enable signal (not shown in FIG. 5, "SE" in FIG. 4) is split into two parts. The first part bypasses the scrambler circuitry 520 and controls regular scan cells. The other part goes to the scrambler circuitry 520 where it is replaced with a signal produced locally for the purpose of the obfuscation procedure (an example is shown in FIG. 4). When the scrambler circuitry 520 takes over, scan chains belonging to these two classes may need to be appropriately initialized. Scan chains 560 in the figure are conventional scan chains.

Note that scan cells hosted by the mixed mode scan chains are driven (typically in a random fashion) either by the scramble circuitry or by regular flip-flops belonging to exactly the same chains and now working in the functional mode. In the example shown in FIG. 4, the clock cycle counter 420 determines how quickly functionality obfuscation should proceed. The approach that uses pseudorandom values results in selective activation and deactivation of control points, with the average number of active control points saturating over time. This can be easily achieved by deploying a weighted pseudorandom pattern generator whose outputs are obtained by connecting a biasing logic, such as multiple input AND or OR gates, with the outputs of a conventional pseudorandom test pattern generator (PRPG).

If one employs a constant value of 1 to feed the dedicated/mixed mode scan chains, then successive control points are activated until all of them are involved in concealing the circuit original functionality. Furthermore, loading subsequently an opposite logic value to the same scan chains can deactivate the control points, one group at a time. The above processes continue until the successful application of a pre-determined key. A valid key applied before launching the device unlocks it by setting Enable to low, disabling the scramble circuitry, and thus making the control test points transparent in the mission mode.

To more effectively hide security features in an IC and to provide a second line of defense against piracy efforts, the PRPG may use a randomly seeded linear feedback shift register (LFSR). This mechanism produces a new PRPG seed every circuit reset. As a result, every single launch of a device an attacker faces different output data since different groups of test points can be then activated for varying durations. Non-repeatable and non-predictable seeds can be derived, for example, by sampling sources of uncontrollable randomness, typically present in physical structures of chips.

The disclosed technology can be implemented in conjunction with logic BIST or on-chip test compression environment such as the embedded deterministic test (EDT). The EDT technology is a test data compression technology developed by Mentor Graphics Corporation (Wilsonville, Oreg.). Details concerning the EDT technology are provided in Rajski, J., Tyszer, J., Kassab, M. and Mukherjee, N., "Embedded deterministic test," IEEE Trans. CAD, vol. 23, 776-792, May 2004, and U.S. Pat. Nos. 6,327,687; 6,353,842; 6,539,409; 6,543,020; 6,557,129; 6,684,358; 6,708,192; 6,829,740; 6,874,109; 7,093,175; 7,111,209; 7,260,591; 7,263,641; 7,478,296; 7,493,540; 7,500,163; 7,506,232; 7,509,546; 7,523,372; 7,653,851, all of which are hereby incorporated herein by reference.

Figure 6:
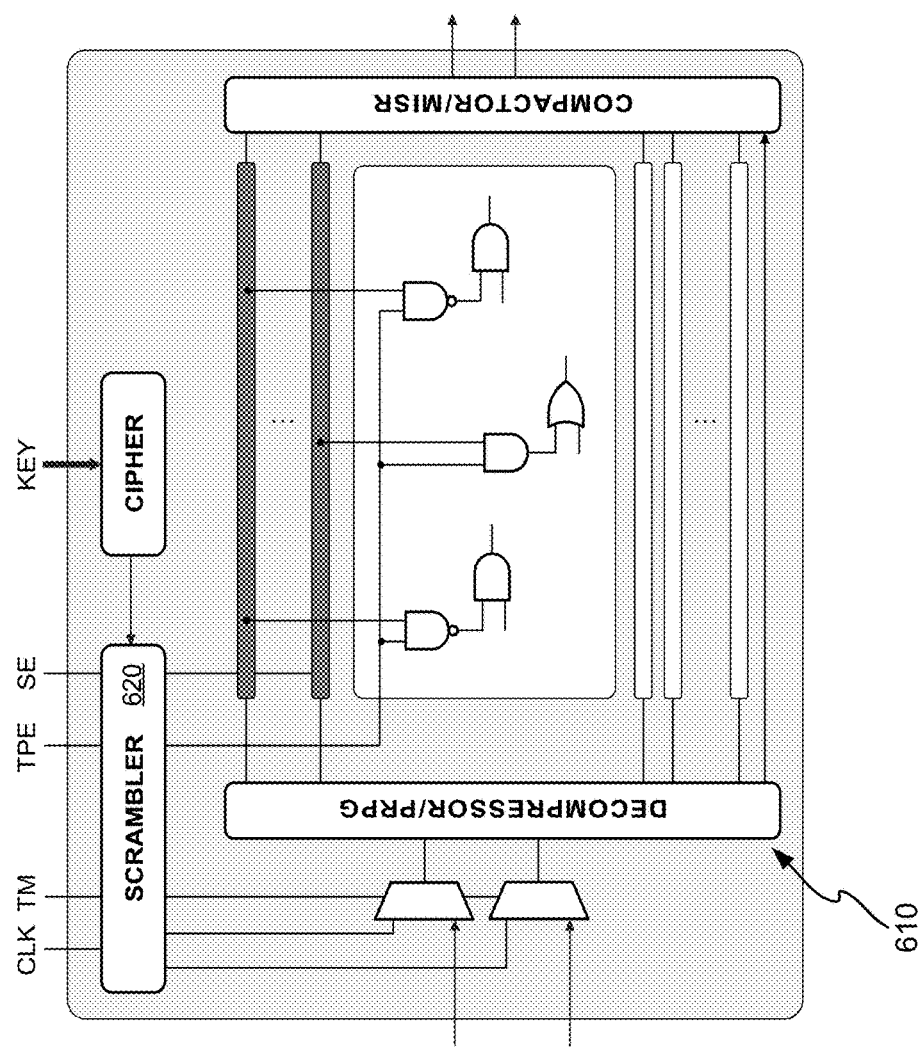
FIG. 6 illustrates an example of implementing the disclosed technology in both an EDT environment and logic built-in self-test (or LBIST) applications.

FIG. 6 illustrates an example of implementing the disclosed technology in in both an EDT environment and logic built-in self-test (or LBIST) applications. A decompressor (PRPG) 610 interfaces the scrambler circuitry 620 with dedicated scan chains in order to activate control points. In this setup, the test point drivers receive random data produced by the scrambler circuitry 620 and further shuffled due to the decompressor logic comprising a ring generator and a phase shifter.

Figure 7:
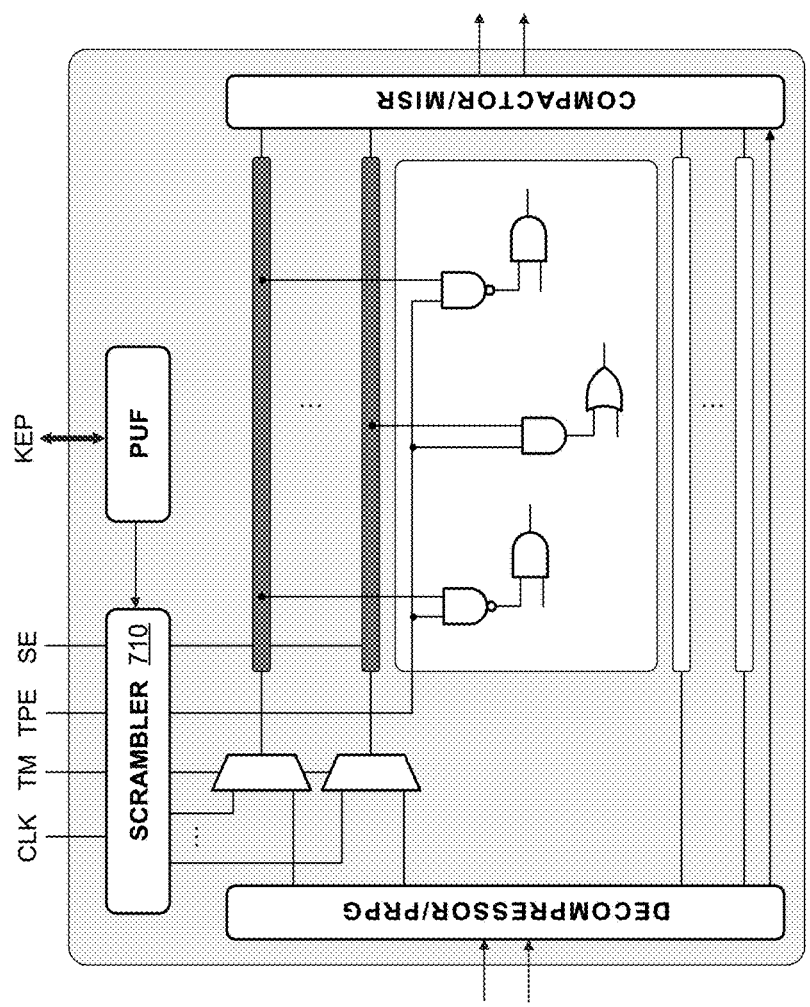
FIG. 7 illustrates another example of implementing the disclosed technology in both an EDT environment and logic built-in self-test (or LBIST) applications.

The scrambler outputs can also be placed directly in front of scan chains, beyond the decompressor structure as shown in FIG. 7. Here, the scrambler circuitry 710 can feed the dedicated scan chains in a more direct manner by feeding them with, for example, constant logic values, if needed. With the scheme of FIG. 7, even a potential insight into implementation details of either EDT or LBIST logic will not help attackers to reverse engineer the remaining parts of the circuit.

Various implementations of the disclosed technology can gradually change a circuit behavior and to significantly elongate this process after the circuit receives an invalid key. This is especially beneficial when an attacker uses a brute force technique against the identity verification circuitry in an attempt to discover a license by systematically trying every possible combination of input symbols until the correct one is found. Although this type of attacks may be unacceptably long, with the help of some heuristics and a lucky coincidence, a correct license could be found within a shorter period of time. Fortunately, the use of control points to obfuscate circuit responses increases remarkably the complexity of crunching output data and makes the brute force attacks technically infeasible. The same applies to other forms of hacking where the time spent on analyzing randomly produced output responses becomes a crucial factor that makes any attack unbearably expensive, as the attacker will not be able to realize, for a long time, that an obfuscation strategy is actually in progress.

If the license is not stored on a chip, none of secret-extracting methods is applicable. Moreover, every chip employing PUF-based verification module features unique CRPs, therefore they cannot be discovered by watching transient signals on an activated (other) chip. Different chips have virtually always different keys. Eavesdropping on data exchanged during chip activation will not reveal the license for other chips.

In contrast to solutions deploying the key gates as a part of circuit logic, various implementations of the disclosed technology are resilient to fault-analysis attacks addressing low correlation between the key bits. Typically, these attacks are carried out by simulating test patterns and comparing results with the correct outputs obtained by running the same input patterns on the functional IC. The solution based on control test points is visibly more resistant than the key breaking by means of simulation. This is because the test points are integral part of scan chains controlled by the scrambler circuitry.

Illustrative Operating Environment

Various examples of the disclosed technology may be implemented through the execution of software instructions by a computing device such as a programmable computer. The software instructions may be stored on a non-transitory computer-readable medium. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, or a solid state storage device.

Figure 8:
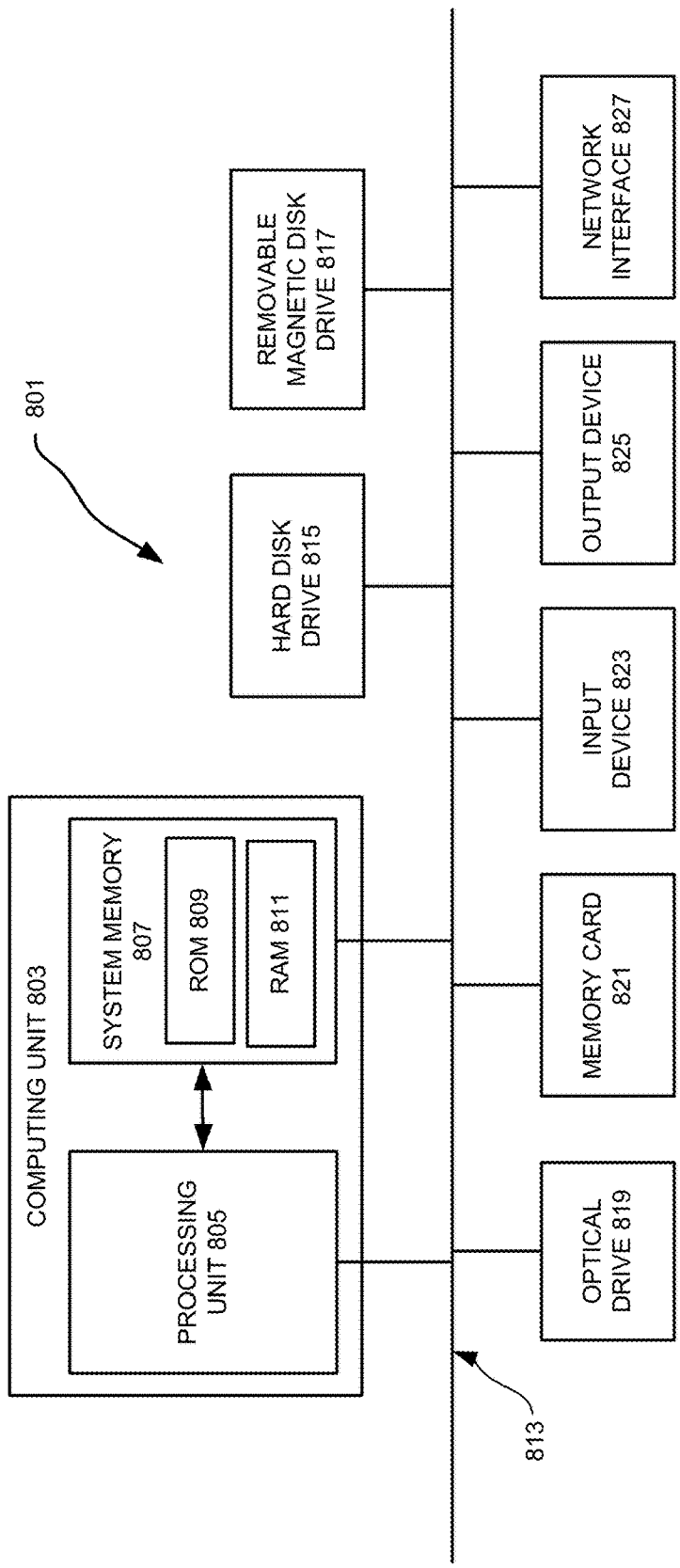
FIG. 8 illustrates a programmable computer system with which various embodiments of the disclosed technology may be employed.

The execution of software instructions will insert security/test-related circuitry as shown in FIG. 3 into a circuit design. Accordingly, FIG. 8 shows an illustrative example of a computing device 801. As seen in this figure, the computing device 801 includes a computing unit 803 with a processing unit 805 and a system memory 807. The processing unit 805 may be any type of programmable electronic device for executing software instructions, but will conventionally be a microprocessor. The system memory 807 may include both a read-only memory (ROM) 809 and a random access memory (RAM) 811. As will be appreciated by those of ordinary skill in the art, both the read-only memory (ROM) 809 and the random access memory (RAM) 811 may store software instructions for execution by the processing unit 805.

The processing unit 805 and the system memory 807 are connected, either directly or indirectly, through a bus 813 or alternate communication structure, to one or more peripheral devices. For example, the processing unit 805 or the system memory 807 may be directly or indirectly connected to one or more additional memory storage devices, such as a "hard" magnetic disk drive 815, a removable magnetic disk drive 817, an optical disk drive 819, or a flash memory card 821. The processing unit 805 and the system memory 807 also may be directly or indirectly connected to one or more input devices 823 and one or more output devices 825. The input devices 823 may include, for example, a keyboard, a pointing device (such as a mouse, touchpad, stylus, trackball, or joystick), a scanner, a camera, and a microphone. The output devices 825 may include, for example, a monitor display, a printer and speakers. With various examples of the computer 801, one or more of the peripheral devices 815-825 may be internally housed with the computing unit 803. Alternately, one or more of the peripheral devices 815-825 may be external to the housing for the computing unit 803 and connected to the bus 813 through, for example, a Universal Serial Bus (USB) connection.

With some implementations, the computing unit 803 may be directly or indirectly connected to one or more network interfaces 827 for communicating with other devices making up a network. The network interface 827 translates data and control signals from the computing unit 803 into network messages according to one or more communication protocols, such as the transmission control protocol (TCP) and the Internet protocol (IP). Also, the interface 827 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 801 is illustrated as an example only, and it not intended to be limiting. Various embodiments of the disclosed technology may be implemented using one or more computing devices that include the components of the computer 801 illustrated in FIG. 8, which include only a subset of the components illustrated in FIG. 8, or which include an alternate combination of components, including components that are not shown in FIG. 8. For example, various embodiments of the disclosed technology may be implemented using a multi-processor computer, a plurality of single and/or multiprocessor computers arranged into a network, or some combination of both.

CONCLUSION

While the disclosed techniques has been described with respect to specific examples including presently preferred modes of carrying out the disclosed techniques, those skilled in the art will appreciate that there are numerous variations and permutations of the above described systems and techniques that fall within the spirit and scope of the disclosed techniques as set forth in the appended claims. For example, while specific terminology has been employed above to refer to electronic design automation processes, it should be appreciated that various examples of the disclosed techniques may be implemented using any desired combination of electronic design automation processes.

What is claimed is:

1. An integrated circuit, comprising:
   identity verification circuitry configured to generate an identity verification result for an access to the integrated circuit;
   test point circuitry comprising scan cells and logic gates, the test point circuitry configured to inject specific logic values at control test points inserted into the integrated circuit; and
   scrambler circuitry coupled to the identity verification circuitry and the test point circuitry, the scrambler circuitry comprising a pseudorandom pattern generator and the scrambler circuitry configured to:
   in a test operation mode:
   enable or disable the control test points and the scan cells according to a testing signals provided for a test of the integrated circuit;
   in a mission operation mode:
   responsive to a valid identity verification result from the identity verification circuitry, disable the control test points through the logic gates such that the control test points are transparent to functionality of the integrated circuit; and responsive to an invalid verification result from the identity verification circuitry, enable the control test points through the logic gates and activate the control test points through a scan line wherein, when a given control test point is activated, the given control test point injects a specific logic value at the control test point, wherein the scrambler circuitry is configured to provide the scan line to the scan cells of the test point circuitry as a pseudorandom value generated by the pseudorandom pattern generator such that the pseudorandom value provided as the scan line selectively activates and deactivates different control test points in the test point circuitry in the mission mode.

2. The integrated circuit recited in claim 1, wherein the identity verification circuitry comprises a block cipher, a stream cipher, a hash function module or a physical unclonable function (PUF).

3. The integrated circuit recited in claim 1, wherein the pseudorandom pattern generator is a randomly-seeded linear-feedback shift register.

4. The integrated circuit recited in claim 1, wherein the pseudorandom pattern generator is a weighted pseudorandom pattern generator.

5. The integrated circuit recited in claim 1, wherein the scrambler circuitry further comprises a clock cycle counter that controls a rate at which the scrambler circuitry activates the control test points responsive to the invalid verification result from the identity verification circuitry.

6. The integrated circuit recited in claim 5, wherein the scrambler circuitry controls the rate at which the control test points are activated by asserting a scan cell enable signal to the scan cells after a pre-defined number of clock cycles set by the clock cycle counter.

7. The integrated circuit recited in claim 1, wherein the scan line is directly shifted into the scan cells.

8. One or more non-transitory computer-readable media storing computer-executable instructions for causing one or more processors to insert circuitry into a circuit design, the circuitry comprising:

identity verification circuitry configured to generate an identity verification result for an access to the integrated circuit;

test point circuitry comprising scan cells and logic gates, the test point circuitry configured to inject specific logic values at control test points inserted into the integrated circuit; and scrambler circuitry coupled to the identity verification circuitry and the test point circuitry, the scrambler circuitry comprising a pseudorandom pattern generator and the scrambler circuitry configured to:

in a test operation mode:

enable or disable the control test points and the scan cells according to a testing signals provided for a test of the integrated circuit;

in a mission operation mode:

responsive to a valid identity verification result from the identity verification circuitry, disable the control test points through the logic gates such that the control test points are transparent to functionality of the integrated circuit; and responsive to an invalid verification result from the identity verification circuitry, enable the control test points through the logic gates and activate the control test points through a scan line wherein, when a given control test point is activated, the given control test point injects a specific logic value at the control test point, wherein the scrambler circuitry is configured to provide the scan line to the scan cells of the test point circuitry as a pseudorandom value generated by the pseudorandom pattern generator such that the pseudorandom value provided as the scan line selectively activates and deactivates different control test points in the test point circuitry in the mission mode.

9. The one or more non-transitory computer-readable media recited in claim 8, wherein the identity verification circuitry comprises a block cipher, a stream cipher, a hash function module or a physical unclonable function (PUF).

10. The one or more non-transitory computer-readable media recited in claim 8, wherein the pseudorandom pattern generator is a randomly-seeded linear-feedback shift register.

11. The one or more non-transitory computer-readable media recited in claim 8, wherein the pseudorandom pattern generator is a weighted pseudorandom pattern generator.

12. The one or more non-transitory computer-readable media recited in claim 8, wherein the scrambler circuitry further comprises a clock cycle counter that controls a rate at which the scrambler circuitry activates the control test points responsive to the invalid verification result from the identity verification circuitry.

13. The one or more non-transitory computer-readable media recited in claim 12, wherein the scrambler circuitry controls the rate at which the control test points are activated by asserting a scan cell enable signal to the scan cells after a pre-defined number of clock cycles set by the clock cycle counter.

14. The one or more non-transitory computer-readable media recited in claim 8, wherein the scan line is directly shifted into the scan cells.

15. A method, comprising:

generating an invalid identity result by identity verification circuitry in an integrated circuit responsive to an unauthorized access to the integrated circuit, and responsive to generation of the invalid identity result:

using the invalid identity result to enable control test points of test point circuitry by scrambler circuitry, the scrambler circuitry comprising a pseudorandom pattern generator; and loading, by the scrambler circuitry, a scan line to scan cells associated with the control test points to selectively activate the control test points based on the scan line, wherein loading the scan line to the scan cells comprises loading a pseudorandom value generated by the pseudorandom pattern generator as the scan line such that the pseudorandom value provided as the scan line selectively activates and deactivates different control test points in the test point circuitry.

16. The method recited in claim 15, wherein the identity verification circuitry comprises a block cipher, a stream cipher, a hash function module or a physical unclonable function (PUF).

* * * * *